United States Patent
Schoepf et al.

(10) Patent No.: US 9,523,508 B2
(45) Date of Patent: Dec. 20, 2016

(54) CONTROL DEVICE FOR AN HEATING DEVICE AND SYSTEM FOR CONTROLLING AN HEATING INSTALLATION

(75) Inventors: Friedrich Schoepf, Sternenfels-Diefenbach (DE); Markus Brandstetter, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 446 days.

(21) Appl. No.: 13/574,442

(22) PCT Filed: Dec. 14, 2010

(86) PCT No.: PCT/EP2010/069586
§ 371 (c)(1),
(2), (4) Date: Oct. 3, 2012

(87) PCT Pub. No.: WO2011/091905
PCT Pub. Date: Aug. 4, 2011

(65) Prior Publication Data
US 2013/0026243 A1    Jan. 31, 2013

(30) Foreign Application Priority Data
Jan. 26, 2010  (DE) ........................ 10 2010 001 199

(51) Int. Cl.
F24D 19/10    (2006.01)
G05D 23/19    (2006.01)

(52) U.S. Cl.
CPC ....... *F24D 19/1009* (2013.01); *F24D 19/1018* (2013.01); *F24D 19/1033* (2013.01); *G05D 23/1902* (2013.01); *F24D 2220/042* (2013.01); *F24H 2240/08* (2013.01)

(58) Field of Classification Search
CPC ............ F24D 19/1009; F24D 2220/042; F24H 2240/08; G05D 23/1902
USPC ................................................... 236/1 C, 94
See application file for complete search history.

(56) References Cited

U.S. PATENT DOCUMENTS

| | | | | |
|---|---|---|---|---|
| 2,666,883 A | * | 1/1954 | Guelpa | H01M 10/443 200/81.5 |
| 4,629,115 A | * | 12/1986 | Lampert | G01K 17/08 165/11.1 |
| 4,728,780 A | * | 3/1988 | Uchino | 219/530 |
| 4,836,442 A | * | 6/1989 | Beckey | G05D 23/275 236/46 R |

(Continued)

FOREIGN PATENT DOCUMENTS

| | | |
|---|---|---|
| CN | 1873271 | 12/2006 |
| CN | 101619872 | 1/2010 |

(Continued)

OTHER PUBLICATIONS

International Search Report for PCT/EP2010/069586, dated Jul. 5, 2012.

*Primary Examiner* — Len Tran
*Assistant Examiner* — Kun Kai Ma
(74) *Attorney, Agent, or Firm* — Norton Rose Fulbright US LLP; Gerard Messina

(57) ABSTRACT

A control device for a heating device includes: a thermostat having a control unit, the control unit being connected to an energy source which is used to operate the control unit. The energy source is configured to generate energy in response to the presence of temperature differences between two reference points.

9 Claims, 2 Drawing Sheets

(56) References Cited

U.S. PATENT DOCUMENTS

| | | | |
|---|---|---|---|
| 5,114,070 A | | 5/1992 | Lilja et al. |
| 5,316,073 A | * | 5/1994 | Klaus et al. .................. 165/11.1 |
| 6,293,471 B1 | * | 9/2001 | Stettin .................... F24H 9/2021 |
| | | | 165/268 |
| 6,662,866 B1 | * | 12/2003 | Heath ...................... F23N 5/203 |
| | | | 165/267 |
| 7,432,477 B2 | * | 10/2008 | Teti ...................... F24D 19/1009 |
| | | | 219/491 |
| 7,647,895 B2 | * | 1/2010 | Donelly .................... F22D 1/12 |
| | | | 122/14.21 |
| 2006/0102731 A1 | * | 5/2006 | Mueller .................. F23N 5/203 |
| | | | 236/51 |
| 2007/0228183 A1 | * | 10/2007 | Kennedy ............. F24F 11/0012 |
| | | | 236/1 C |
| 2007/0241203 A1 | * | 10/2007 | Wagner et al. ................ 236/1 C |
| 2009/0048719 A1 | * | 2/2009 | McLaughlin et al. ........ 700/299 |
| 2010/0225167 A1 | * | 9/2010 | Stair ........................ H02J 3/14 |
| | | | 307/29 |
| 2012/0080531 A1 | * | 4/2012 | Li ...................... G05D 23/1902 |
| | | | 236/47 |

FOREIGN PATENT DOCUMENTS

| | | |
|---|---|---|
| EP | 0 717 332 | 6/1996 |
| EP | 1 116 921 | 7/2001 |
| EP | 2 144 015 | 1/2010 |
| GB | 2 216 293 | 10/1989 |
| GB | 2 278 934 | 12/1994 |
| GB | 2 452 345 | 3/2009 |

\* cited by examiner

CONTROL DEVICE FOR AN HEATING DEVICE AND SYSTEM FOR CONTROLLING AN HEATING INSTALLATION

BACKGROUND OF THE INVENTION

1. Field of the Invention

The present invention relates to a control device for a heating device.

2. Description of the Related Art

Such a known control device has a thermostat which makes possible the selection of various heating programs or the setting of certain heating element temperatures at certain daytimes and nighttimes, via an operating unit having an input keyboard. In this instance, the thermostat is fed by an energy source which is usually developed as a battery or an accumulator. Conditioned upon this, a certain maintenance or care effort is required so as to keep the energy source continuously charged, so that the control device keeps functioning at all times.

For the energy-efficient heating of a building, it is particularly necessary that each room be always heated only to the desired or required temperature, this temperature being able to vary with the time of day as well as, for example, the course of days. Thus, for example, in the case of rooms used for business purposes, it is usually not necessary to heat them on the weekend. Considerable energy savings may be achieved using targeted temperature regulation, in which the rooms of a building are regarded within the scope of an overall energy management.

Furthermore, it is known from a publication of the Fraunhofer Institute, of Feb. 6, 2009, that, using the temperature difference between a body and the room temperature, one may operate a voltage transformer that is developed as a semiconductor component. This semiconductor component generates a certain electrical energy in this context, using which a clock or the like may be driven.

BRIEF SUMMARY OF THE INVENTION

An object of the present invention is improving a control device for a heating device in such a way that an optimal regulation of the room temperature is able to be achieved, independently of a possible state of charge of the energy source. The energy requirement for heating a room may thereby be reduced, and the operating convenience may be increased. The present invention is based on the idea of using an energy source which generates energy in response to the presence of temperature differences between two reference points. In other words, this means that maintenance and care measures for the energy source are not required, so that the control device always works reliably in the desired manner.

In one preferred specific embodiment of the present invention it is provided that the energy source is integrally situated in the thermostat. Thereby a compact design of the control device may be achieved, in which no connections between the energy source and the thermostat are required, which could otherwise have to be performed by an operator or a person skilled in the art.

In one preferred specific embodiment it is provided, in this context, that the one reference point is situated at least in indirect operative connection to an heating pipe. This makes possible especially the possibility that, in response to switching on the boiler at the beginning of the heating period, an heating pipe, which is situated in operative connection to the thermostats, is heated to a certain first temperature, which is greater than the room temperature in which the thermostat is located. This makes it possible that the energy source is able to generate enough energy so as at least to operate users which require relatively little energy or to output the energy obtained to an energy store, for example.

In this context it is quite especially preferred if the energy source is connected to a temporary energy store. Thereby, even at relatively low temperature differences between the two reference points, an at least partly charged temporary energy store being assumed, enough energy reserves are available to operate a thermostat having an electromagnetically adjustable valve, for example.

In one additional embodiment of the present invention it is provided that the control unit is connected to an input/output unit for manual input and optical representation of values. This enables an individual setting to be made which satisfies requests or requirements specific to an operator.

One further embodiment of the present invention provides that the control unit have bidirectional data transmission means for communication with at least one central control unit. This offers the possibility of developing an overall energy management, for instance, for a building which, seen as a whole, makes possible the lowest possible energy requirement. Then, in particular, the expenditure for operating the individual control units may be reduced, for example, since the desired or the required values are able to be generated using the central control unit.

In this case, it is quite especially preferred if the data transmission means are developed in a wireless manner. If that is the case, in a retrofitted installation of control devices in a building, no additional lines, that would have a relatively high investment requirement, are necessary. In addition, the individual control devices are very simple to exchange, under these circumstances.

In order to make possible a simple installation, particularly also by an end user, it is also preferably provided that the thermostat has a standard terminal for the manual connection to an heating device.

An optimal adjustment or regulation of the room temperature is enabled if the thermostat has a temperature sensor for the environmental temperature, that is connected to the control unit. It is thereby possible in a particularly simple and reliable manner to regulate or set a room temperature perceived by the operator as comfortable.

The present invention also includes a system for controlling an heating device having a central control unit and at least one control device according to the present invention.

DETAILED DESCRIPTION OF THE INVENTION

Figure 1:
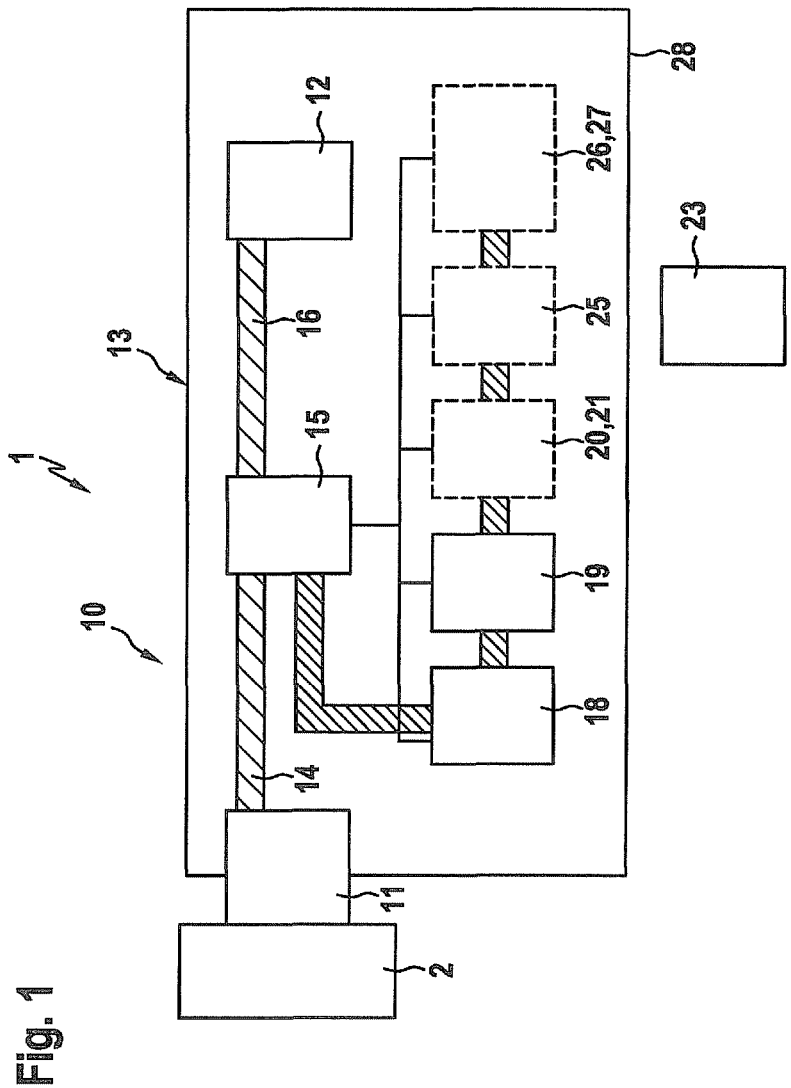
FIG. 1 shows a simplified block diagram of a control device according to the present invention for an heating device.

FIG. 1 shows a control device 10 for a heating device 1. Heating device 1 is an heating device 1 particularly that is located in a building, such as an apartment house or a commercial building, and is used for the tempering or the heating of a room. Heating device 1 has an heating element 2, not shown in detail, which is connected in a known manner to an heat generator, such as a boiler, via heating pipes.

Heating element 2 has a standardized valve connection, via which a thermostat 13 is able to be manually connected to heating element 2, particularly also by an end user. Thermostat 13 has a first thermal conductor 14, which is connected to an energy production unit 15. A second thermal conductor 16 is connected to thermostat 13 in such a way that at the end of the second thermal conductor 16 facing away from energy production unit 15, the room temperature prevails approximately at a thermostat head 12. By contrast, first thermal line 14 is connected to valve connection 11 in such a way that at the end of first thermal conductor 14, facing away from energy production unit 15, the temperature is prevailing which sets in at the pipe connection of the heating pipes for heating element 2.

Energy production unit 15 is of the type which, in response to the presence of different temperatures at two reference points, provides or produces at least a small amount of energy. This may involve a voltage transformer developed as a semiconductor component. In this case, first thermal conductor 14 acts as a first reference point, while second thermal conductor 16 acts as the second reference point.

Energy production unit 15 is connected to a control and regulation unit 18. Control and regulation unit 18 is connected to a positioning motor 19 which is used for the electromotoric adjustment of the mechanical valve of thermostat 13, and thus the rate of flow of energy at heating element 2.

It may optionally be provided that a data transmission unit 20 be provided, particularly in the form of a radio module 21, which transmits output values, generated by control and regulating unit 18, which are also used for ascertaining the energy requirement of heating element 2, in a wireless manner to a central control unit 23. Central control unit 23, in turn, is of course also able to transmit data to control device 10 and control and regulation unit 18, in order to actuate them in a certain manner.

Furthermore, it may be provided that control device 10 has an input/output unit 25 which makes possible, for instance, a manual data input using a keyboard by an operator, and moreover a display unit, for instance in the form of a display, for checking values that have been input and indicate certain values to the operator. Finally, a measuring unit 26 may also be provided, which includes particularly a temperature sensor 27. Using temperature sensor 27, the room temperature is recorded and is supplied to control and regulation unit 18 as an input value.

In particular it is provided that control and regulation unit 18, positioning motor 19, data transmission unit 20, input and output unit 25 and measuring unit 26 are integral components of thermostat 13, and are thus situated within common housing 28 of thermostat 13.

Figure 2:
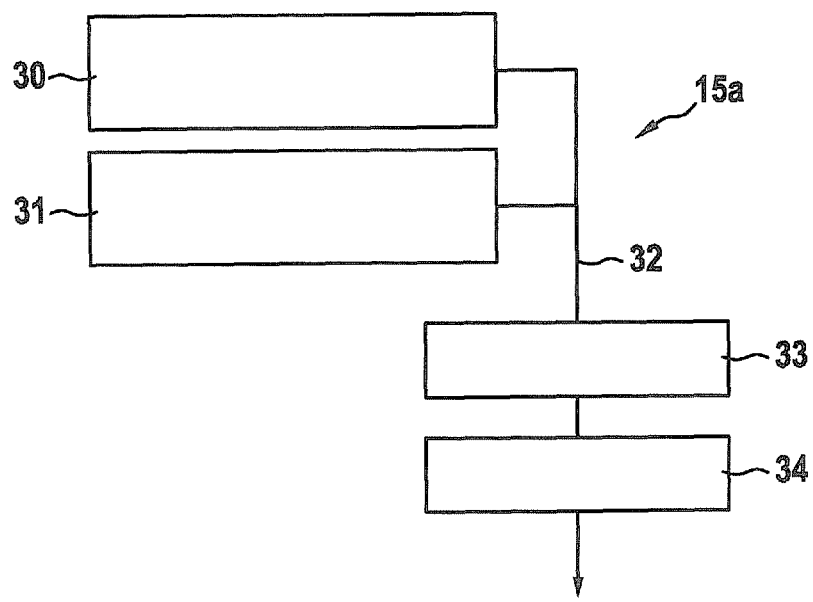
FIG. 2 shows a detail of a modified specific embodiment of an energy production unit, also in a symbolic representation.

FIG. 2 shows one variant of energy production unit 15. In this case, energy production unit 15a has a first module 30, which is used for energy production at relatively low temperature differences. Furthermore, a second module 31 is optionally provided, which is used for energy production at relatively large temperature differences. The two modules 30, 31 are connected via a line 32 to a temporary energy store 33 or a buffer accumulator, which is connected to an energy management unit 34.

Temporary energy store 33 is used for the internal cushioning of peak loads and the storing of energy after restarting heating device 1. Using energy management unit 34, which is also a component of control device 10, the individual units referred to above or the assemblies of control device 10 are actuated or operated as a function of the available energy quantity, in a targeted manner or in a certain sequence.

Control device 10 works as follows:

After longer operating pauses or at the beginning of the heating period, the heating installation of the building or the boiler is switched on, whereupon the heating pipes heat up at least into the region of valve connection 11. This temperature at valve connection 11 is usually some degrees warmer than the room temperature prevailing in the room. As a result, the two thermal conductors 14 and 16 detect different temperatures, which are used to generate electrical energy, using energy production unit 15. This electrical energy is used either directly to drive control and regulation unit 18 or, to operate energy management system 34 via temporary energy store 33.

As soon as control and regulation unit 18 has enough energy for operation, this may, for instance, drive positioning motor 19, so as thereby to regulate heating element 2 in the desired manner or to implement the values present in control and regulation unit 18 in a corresponding setting of positioning motor 19. Furthermore, using the energy provided, radio module 21 may also be operated, which transmits the currently set data in control and regulation device 18 as well as measured values recorded by measuring unit 26 to central control unit 23. In case other values are filed in central control unit 23 than in control and regulation unit 18, these other values are now supplied to control and regulation unit 18 as new input values. In addition, because of the supplied energy of energy production unit 15, in addition, enough energy is available so as to localize the individual thermostats 13 in the building, or rather to assign them to certain rooms. Thereby a simple, automated installation of decentralized control devices 10 is also made possible. In this instance, a particularly simple control is assured if, in central control unit 23, standard specifications are able to be offered for regulations.

Because of measuring unit 26 having temperature sensor 27, the possibility is created of transmitting to central control unit 23 the heating curve of the room. With that, central control unit 23 is enabled to adapt the energy management or the heating characteristic of the room and its heating curve in such a way that it is comfort-optional and energy-optional.

Control device 10 according to the present invention may be modified in multiple ways, without deviating from the idea of the present invention. This is the utilization of an energy production unit 15, which generates enough energy, independently of other current sources, based on temperature differences at reference points, to operate at least one control and regulation device 18 of a thermostat 13 so as thereby to make possible an autonomous regulation of a decentralized heating element 2.

What is claimed is:

1. A control device for a heating device, comprising:
a thermostat having a control unit; and
an electrical energy source connected to the control unit and electrically powering the control unit, wherein the electrical energy source generates electrical energy to electrically power the control unit in response to a presence of temperature differences between two reference points connected to the electrical energy source;
wherein one reference point detects an environmental temperature and the other reference point detects a temperature of a heating pipe, and wherein the electrical energy source includes a first module and a second module, the first module generating electrical energy to electrically power the control unit in response to a presence of a temperature difference within a first difference range, and the second module generating electrical energy to electrically power the control unit in response to a presence of a temperature difference within a second difference range, the second difference range representing greater temperature differences than the first difference range.

2. The control device as recited in claim 1, wherein the energy source is integrally situated in the thermostat.

3. The control device as recited in claim 1, wherein the energy source is connected to a temporary energy store.

4. The control device as recited in claim 1, wherein the control unit is connected to an input/output unit configured for manual input and optical representation of values.

5. The control device as recited in claim 1, wherein the control unit has a bidirectional data transmission unit for communication with at least one central control unit.

6. The control device as recited in claim 5, wherein the data transmission unit is configured for wireless transmission.

7. The control device as recited in claim 1, wherein the thermostat has a standard terminal for manual connection to the heating device by an operator.

8. The control device as recited in claim 1, wherein the thermostat has a temperature sensor configured to measure the environmental temperature, the temperature sensor being connected to the control unit.

9. A system for controlling a heating device, comprising:
a central control unit; and
a control device for the heating device, the control device including: (i) a thermostat having a local control unit; and (ii) an electrical energy source connected to the local control unit and electrically powering the local control unit, wherein the electrical energy source generates electrical energy to electrically power the local control unit in response to a presence of temperature differences between two reference points connected to the electrical energy source, and wherein the local control unit has a bidirectional data transmission unit for communication with the central control unit;
wherein one reference point detects an environmental temperature and the other reference point detects a temperature of a heating pipe, and wherein the electrical energy source includes a first module and a second module, the first module generating electrical energy to electrically power the control unit in response to a presence of a temperature difference within a first difference range, and the second module generating electrical energy to electrically power the control unit in response to a presence of a temperature difference within a second difference range, the second difference range representing greater temperature differences than the first difference range.

* * * * *